(12) United States Patent
Sasaki et al.

(10) Patent No.: US 8,172,467 B2
(45) Date of Patent: May 8, 2012

(54) OPTICAL BACKPLANE CONNECTOR, PHOTOELECTRIC CONVERSION MODULE AND OPTICAL BACKPLANE

(75) Inventors: Junichi Sasaki, Tokyo (JP); Kazuhiko Kurata, Tokyo (JP); Takashi Yoshikawa, Tokyo (JP); Shigeyuki Yanagimachi, Tokyo (JP)

(73) Assignee: NEC Corporation, Tokyo (JP)

( * ) Notice: Subject to any disclaimer, the term of this patent is extended or adjusted under 35 U.S.C. 154(b) by 1116 days.

(21) Appl. No.: 11/918,948

(22) PCT Filed: Apr. 21, 2006

(86) PCT No.: PCT/JP2006/308396
§ 371 (c)(1),
(2), (4) Date: Oct. 22, 2007

(87) PCT Pub. No.: WO2006/115192
PCT Pub. Date: Nov. 2, 2006

(65) Prior Publication Data
US 2009/0310914 A1 Dec. 17, 2009

(30) Foreign Application Priority Data
Apr. 21, 2005 (JP) .................................. 2005-123638

(51) Int. Cl.
*G02B 6/26* (2006.01)
*G02B 6/36* (2006.01)
*G02B 6/42* (2006.01)
*G02B 6/44* (2006.01)

(52) U.S. Cl. ................. 385/89; 385/31; 385/32; 385/88; 385/101

(58) Field of Classification Search .................... 385/31, 385/32, 88, 89, 101
See application file for complete search history.

(56) References Cited

U.S. PATENT DOCUMENTS

| 4,465,333 A | 8/1984 | Caserta et al. |
| 5,155,785 A | 10/1992 | Holland et al. |

(Continued)

FOREIGN PATENT DOCUMENTS
JP 4-11206 A 1/1992
(Continued)

OTHER PUBLICATIONS

Eisenbacher et al., "Infineon: PAROLI® Backplane Solution," http://www.infineon.jp/designlink/fiber/pobs.php Apr. 2003.

*Primary Examiner* — Ryan Lepisto
*Assistant Examiner* — Jerry Blevins
(74) *Attorney, Agent, or Firm* — Young & Thompson

(57) ABSTRACT

An optical backplane connector with a board removable (being possible to insert and remove) therein in the direction perpendicular to the backplane plate surface is arranged on a backplane having optical transmission paths. The optical backplane connector accommodates a photoelectric conversion module in such a manner the incident and exit light are perpendicular to the backplane and a transparent board with a photoelectric conversion element mounted thereon is perpendicular to the board and parallel to the backplane. The conduction between the electric contacts of the photoelectric conversion module and the inner electric contacts of the optical backplane connector is held by mechanical contact. At the end portion of the optical transmission path on the backplane, an optical connector having a 45' mirror and guide pins is mounted. The positioning operation is achieved by fitting the guide pins of the optical connector with the guide holes of the photoelectric conversion module.

18 Claims, 14 Drawing Sheets

U.S. PATENT DOCUMENTS

| | | | |
|---|---|---|---|
| 5,195,154 A | * | 3/1993 | Uchida ............... 385/88 |
| 5,277,930 A | | 1/1994 | Uchida |
| 5,381,496 A | | 1/1995 | Morlion et al. |
| 2006/0078248 A1 | * | 4/2006 | Sasaki et al. ............... 385/14 |

FOREIGN PATENT DOCUMENTS

| | | |
|---|---|---|
| JP | 4-106977 A | 4/1992 |
| JP | 5-283135 | 10/1993 |
| JP | 6-19838 | 1/1994 |
| JP | 7-176716 A | 7/1995 |
| JP | 9-15458 A | 1/1997 |
| JP | 10-135911 A | 5/1998 |
| JP | 2001-42171 | 2/2001 |
| JP | 2002-26549 | 1/2002 |
| JP | 2002-76374 A | 3/2002 |
| JP | 2002-296445 | 10/2002 |
| JP | 2003-283075 | 10/2003 |

* cited by examiner

FIG.10
(a)
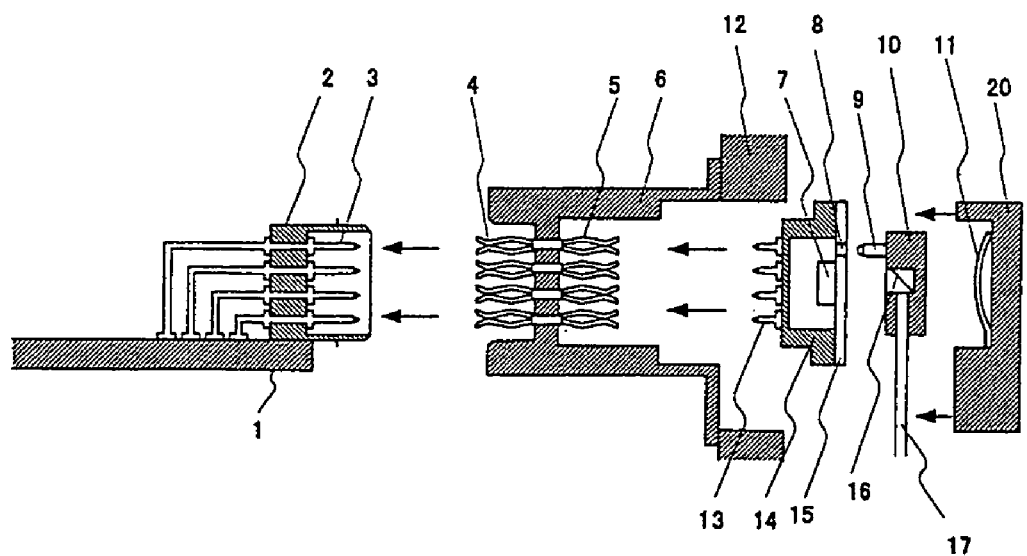
(b)
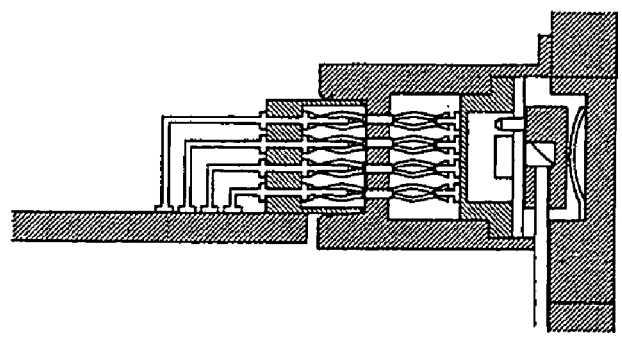

OPTICAL BACKPLANE CONNECTOR, PHOTOELECTRIC CONVERSION MODULE AND OPTICAL BACKPLANE

TECHNICAL FIELD

This invention relates to an optical backplane connector, a photoelectric conversion module, an optical backplane, an optical transmission device and a photoelectric conversion method for optically interconnecting the circuit boards in information equipment such as a router or a server.

BACKGROUND ART

In recent years, the amount of the information flowing through a network has been increased by the spread of a wide-band network, and the information processing capacity in the information equipment such as a router or a server has been required to be improved. The transmission rate limit of the electrical circuit board used in the equipment, however, constitutes the barrier against an improved equipment capacity. In order to break through this barrier and further improve the information processing capacity in the information equipment, optical interconnection of a plurality of boards accommodated in the equipment is effective. To implement the optical interconnection in the information equipment, a method is generally conceived in which a signal input/output board and a switch board are connected in the direction perpendicular to the optical backplane which optical transmission paths such optical fibers are laid thereon, and the electrical signal on the board is converted into an optical signal by a photoelectric conversion part and sent to the optical backplane, so that the optical signal of the optical backplane is converted into an electrical signal and returned to a board.

The structure for connecting the board to the optical backplane requires the ease of the device maintenance. Among the component elements used for optical interconnection by the optical backplane, the photoelectric conversion part is currently highest in failure rate. The device using the optical backplane, therefore, is required to have a mechanism in which the photoelectric conversion part can be easily replaced.

As a first conventional example, the mechanism described in Non-Patent Document 1 is known. The structure of this mechanism is shown in FIG. 17. FIG. 17 is a diagram showing a general structure. In FIG. 17, the optical fibers connected to a fiber management system 100 are connected to the optical connectors 102 passed through a backplane 101, and the optical connectors 102 are connected to the photoelectric conversion modules 104 arranged on a board 103. In the case where the photoelectric conversion module 104 gets out of order in this configuration, the whole board 103 with the photoelectric conversion modules 104 mounted thereon is replaced or, generally, the photoelectric conversion modules 104 mounted on the board by soldering are replaced by melting the solder using the soldering iron or the repair machine.

As another conventional example of the structure of the part for connecting the circuit board to the optical backplane, the mechanism described in Patent Document 1 is known, in which a board having at an end thereof an optical connector holding a LD (Laser Diode) and a PD (Photo Diode) is inserted into each of optical data buses including a slab optical waveguide, so that the optical data buses and each board are connected to each other optically. According to this prior art, the optical backplane is called the 'optical data bus'. The general structure of the optical data buses is shown in FIG. 18, and the detailed optical connectors thereof in FIG. 19. The LD, PD accommodated in the CAN package are held in each optical connector 50, and the direction in which light is input/output to and from the LD, PD is perpendicular to the optical data buses 30. Each of the optical paths of the optical signals propagating through the optical data buses 30 is bent at the right angle by a 45' mirror arranged on the end surface of each optical data bus 30 and optically coupled with the LD, PD. The electrical connection between LD, PD and the board PK is established by connecting the signal line 62 extending from LD, PD to a connector 64 arranged on each circuit board PK. A rod 56 of each optical connector 50 is arranged via a through hole H of an optical data bus fixing board 10 and a through hole 41h of the printed wiring board 40, so that the optical connectors 50, the optical data bus fixing board 10 and the printed wiring board 40 are set in position relatively. The optical data buses 30 are inserted into optical data bus inserting depressions 14 of the optical data bus fixing board 10. At both longitudinal ends of the upper end surface of an upper case 54, a pair of board fixing portions 60 for erecting the circuit boards PK are arranged. A signal processing IC 66 and an electrical connector 43 are arranged on each circuit board PK. The electrical connector 43 is connected to a corresponding electrical connector 42 of the printed wiring board 40. The optical connectors 50 each include a lower case 52 for accommodating a laser diode LD accommodated in a CAN package and a photodiode PD accommodated in the CAN package, and an upper case 54 fixed on the upper part of the lower case 52.

Non-Patent Document 1: Infineon PAROLI Backplane Solution, April 2003, page. 5 URL (http://www.infineon.com/cgi/ecrm.dll/ecrm/scripts/public_download.jsp?)

Patent Document 1: Japanese Unexamined Patent Publication No. 2003-283075

DISCLOSURE OF THE INVENTION

Problem to Be Solved by the Invention

In order to improve the performance and the function of the information processing equipment, as many electronic parts as possible are desirably mounted in the limited area on the board inserted into the optical backplane. Many photoelectric conversion modules currently used, however, are long in the direction of light incidence and exit, and the photoelectric conversion module proper occupies an area of a considerable size, thereby posing considerable restraints to the board wiring design and the parts layout. Specifically, with the configuration disclosed in Non-Patent Document 1, the photoelectric conversion modules are mounted on the board, and therefore, the parts mounting density of the board cannot be increased thereby making it impossible to improve the cost performance.

With the structure disclosed in Patent Document 1, on the other hand, a specific method of replacing the photoelectric conversion elements which may have got out of order is not described, and it cannot be said that the maintenance ease can be realized. In addition, considering the structure of the optical connector portion, the LD, PD accommodated in the CAN package are held in the optical connector, and the electric signal is connected between the LD, PD and the board using a lead wire. Although the signal transmission rate of not higher than about 1 Gigabit per second can be realized, therefore, this structure cannot meet the requirements of an information processing equipment of a large capacity having the signal transmission rate of not less than 10 Gigabits per second.

An object of this invention is to solve the aforementioned problem in an information processing equipment for interconnecting the boards by an optical backplane and provide an optical backplane which the processing capacity and performance of the information processing system is high and the device maintenance is easy.

Means for Solving the Problem

According to a first aspect of the present invention, there is provided an optical backplane connector mountable on an optical backplane and accommodating at least one photoelectric conversion module therein.

According to a second aspect of the present invention, there is provided an optical backplane connector mountable on an optical backplane, wherein the optical backplane connector mountable has a depression adapted to accommodate at least one of photoelectric conversion module, and electric contacts adapted to be connected to the electric contacts of the photoelectric conversion module are disposed in the depression.

According to a third aspect of the present invention, there is provided a photoelectric conversion module adapted to be fitted in the depression of an optical backplane connector mountable on an optical backplane, the photoelectric conversion module comprising a protrusion to be fitted in the depression, wherein electric contacts is disposed on the face of the protrusion and the electric contacts are connected to electric contacts in the depression of the optical backplane connector.

According to a fourth aspect of the present invention, there is provided an optical backplane mountable thereon an optical backplane connector adapt to accommodate at least one photoelectric conversion module therein, wherein an optical transmission path of at least one channel and an optical connector for changing the direction of light between the optical transmission path and the photoelectric conversion element of the photoelectric conversion module is mountable on the optical backplane; and the optical backplane includes an elastic member for pressing the optical connector in such a manner that the photoelectric conversion element in the photoelectric conversion module is optically coupled to the optical transmission path, the elastic member pressing the surface of the optical connector at an opposite side to the arrange side of the photoelectric conversion module with respect to the optical connector.

According to a fifth aspect of the present invention, there is provided an optical transmission device comprising an optical backplane connector which a photoelectric conversion module is accommodated therein, and an optical backplane including an optical transmission path which is optically coupled to the photoelectric conversion element of the photoelectric conversion module, the optical backplane connector being mounted on the optical backplane.

According to a sixth aspect of the present invention, there is provided a photoelectric conversion method that includes inputting an optical signal input from an optical transmission path to an photoelectric conversion module through an optical connector for bending the optical path substantially perpendicularly, the optical transmission path being arranged substantially in parallel to an optical backplane and the photoelectric conversion module being accommodated removably in the optical backplane connector, and carrying out the photoelectric conversion by the photoelectric conversion module.

Also, according to a seventh aspect of the present invention, there is provided a photoelectric conversion method that includes inputting an electrical signal to a photoelectric conversion module accommodated removably in an optical backplane connector,
changing the direction of light of an optical signal subjected to photoelectric conversion by the photoelectric conversion module, by an optical connector for bending the optical path substantially perpendicularly, and
outputting the optical signal to an optical transmission path arranged substantially in parallel to the optical backplane.

The wording "substantially in parallel" is defined to include "in parallel" and the degree considered substantially "in parallel", and the wording 'substantially perpendicular' is defined to include "perpendicular" and the degree considered substantially "perpendicular".

[Operation]

According to this invention, the photoelectric conversion module can be accommodated in the optical backplane connector. As a result, the parts layout on the board is facilitated without mounting the photoelectric conversion module on the board, and the parts mounting density on the board can be improved, resulting in an improved cost performance.

Also, according to this invention, the connection between the electric contacts of the photoelectric conversion module and the inner electric contacts of the optical backplane connector can be held not by soldering but in a removable state (a state to be possible to insert and remove) by mechanical contact. Even in the case where the photoelectric conversion module gets out of order, therefore, the photoelectric conversion module can be easily replaced by detaching the optical back plane connector without using the soldering iron or repair machine, thereby improving the maintainability.

Further, according to this invention, the photoelectric conversion module is accommodated in the optical backplane connector, and therefore, the insertion and removal between the board and the optical backplane can be carried out not at the optical connector portion but at the electric connector portion. Thus, the optical connector is hardly affected by dust which is peculiar to the optical connector.

Also, the optical backplane according to this invention is structured to include the optical connector which includes the end portion of the optical transmission path and a positioning means for fitting a light direction-changing means and a photoelectric conversion module with each other. As compared with the structure in which the positioning means is arranged directly on the optical backplane, therefore, the relative position of the end portion of the optical transmission path and the positioning means can be easily improved in accuracy.

Also, according to this invention, a mechanism for holding the physical contact between the photoelectric conversion module and the optical connector by elasticity prevents the extra gap from being formed between the photoelectric conversion module and the optical connector and prevents making unstable the coupling efficiency.

Also, according to this invention, the provision of at least one optical backplane connector for optically coupling the photoelectric conversion module to the optical transmission paths extending in a plurality of different directions makes it possible to improve the freedom of the optical wiring on the optical backplane.

Also, according to this invention, the structure in which the photoelectric conversion module can be retrieved from the back face of the optical backplane makes it possible to replace the photoelectric conversion module without pulling out the board in the case of a failure of the photoelectric conversion module, and therefore, the repair work or parts change during the operation of the apparatus is possible.

Effects of the Invention

According to this invention, the photoelectric conversion module can be accommodated in the optical backplane connector, and therefore, the parts layout on the board is facilitated without mounting the photoelectric conversion module on the board, so that the parts mounting density on the board is improved, resulting in a higher cost performance.

Also, according to this invention, the high-accuracy positioning operation normally required in the insertion and removal between the board and the optical backplane is eliminated, thereby facilitating the insertion and removal.

BRIEF DESCRIPTION OF THE DRAWINGS

FIG. 10 A sectional view showing an optical backplane connector and an optical backplane according to a third embodiment of the invention.

EXPLANATION OF REFERENCE NUMERALS

Figure 1:
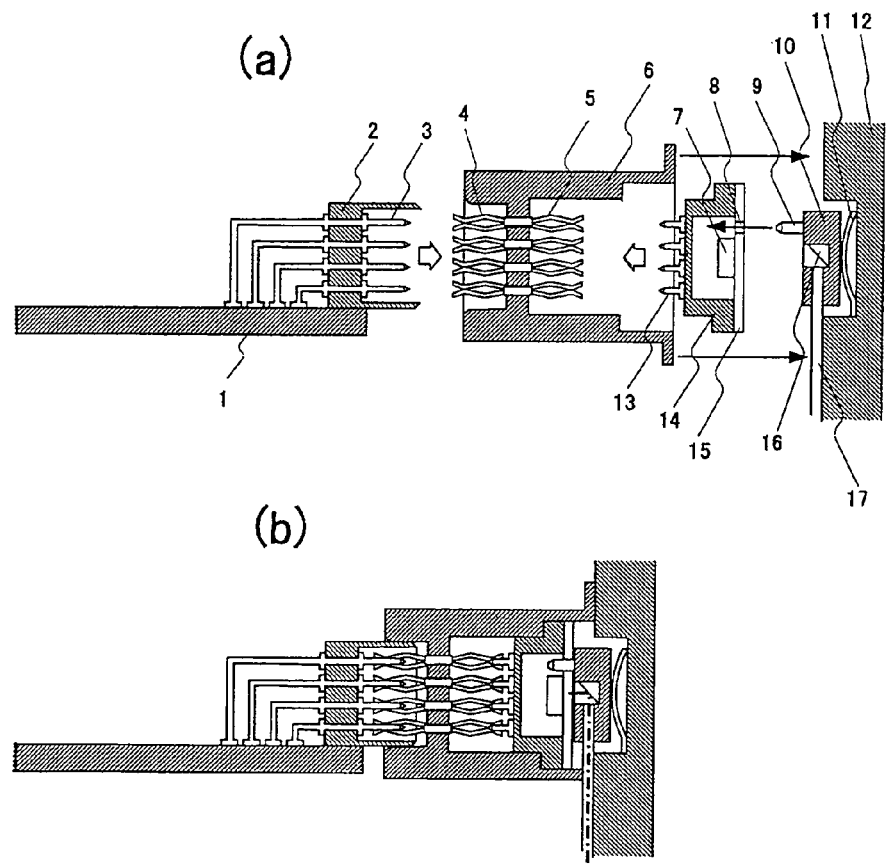
FIG. 1 A sectional view showing an optical backplane connector and an optical backplane according to a first embodiment of the invention.

1 Board
2 Board-side connector
3 Electric contact of board-side connector
4 Outer electric contact of optical backplane connector
5 Inner electric contact of optical backplane connector
6 Optical backplane connector
7 Photoelectric conversion element
8 Fitting hole
9 Guide pin
10 Optical connector
11 Spring
12 Optical backplane
13 Electric contact of photoelectric conversion module
14 Photoelectric conversion module
15 Transparent board
16 45' mirror
17 Optical transmission paths
20 Lid

BEST MODE FOR CARRYING OUT THE INVENTION

Next, embodiments of the invention are explained in detail with reference to the drawings.

First Embodiment

FIGS. 1(a), (b) show the optical backplane connector and the optical backplane according to a first embodiment of the invention. FIG. 1(a) is a sectional view showing the connecting operation between the board and the optical backplane and the assembly and mounting operation of the optical backplane connector, and FIG. 1(b) a sectional view showing the connected state.

Figure 2:
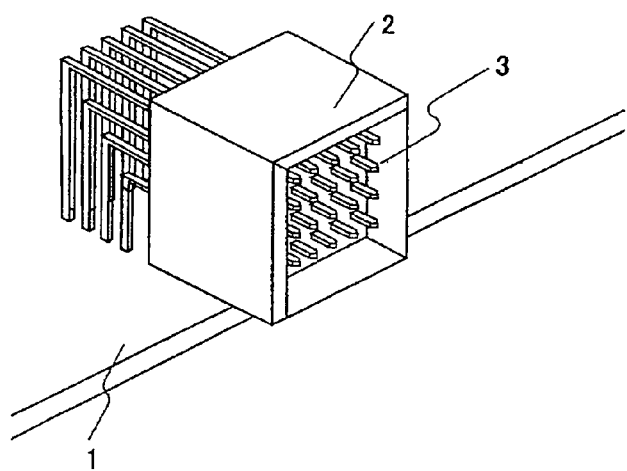
FIG. 2 A perspective view showing a board-side electric connector.
Figure 3:
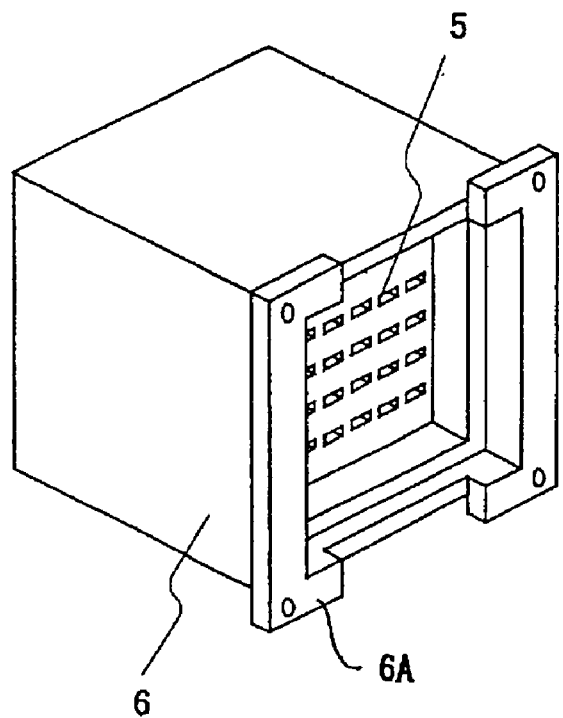
FIG. 3 A perspective view of the optical backplane connector taken from the photoelectric conversion module side.
Figure 4:
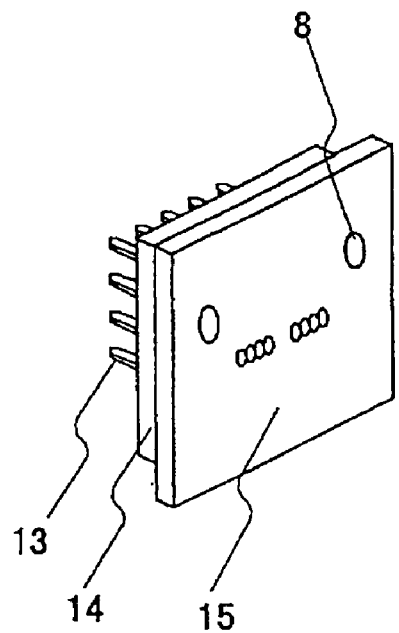
FIG. 4 A perspective view of the photoelectric conversion module taken from the backplane side.
Figure 5:
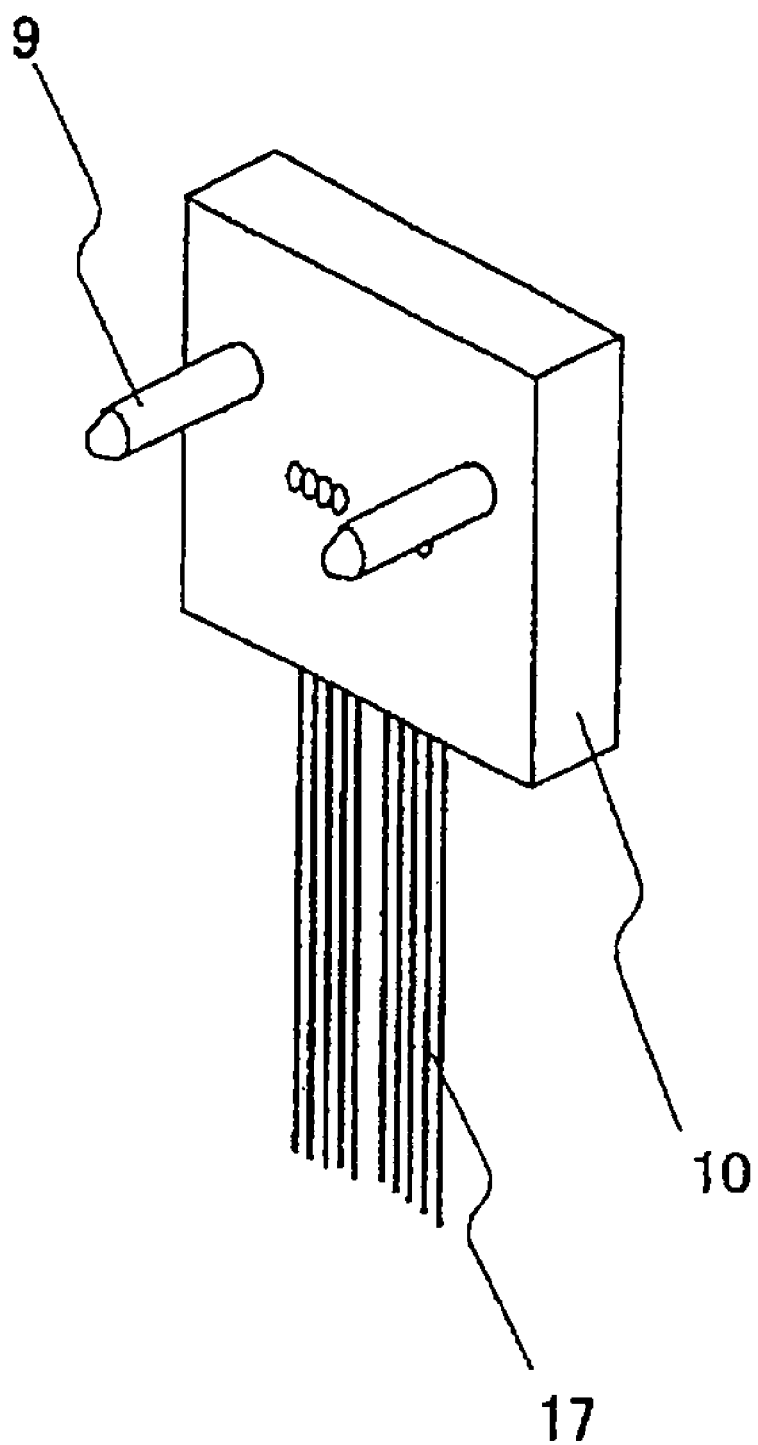
FIG. 5 A perspective view showing an optical connector 10.
Figure 6:
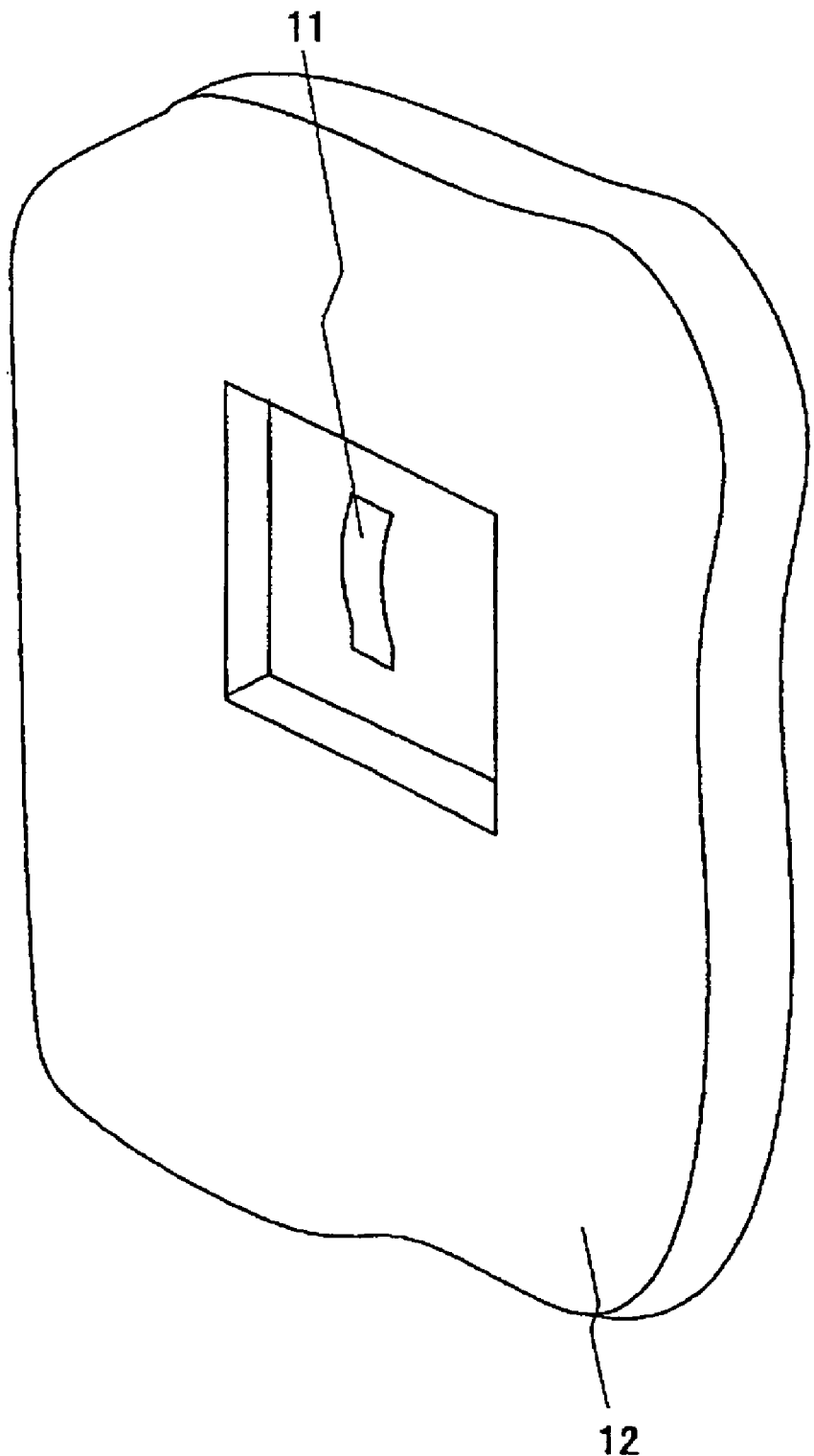
FIG. 6 A perspective view showing a part of the optical backplane.

FIG. 2 is a perspective view showing the board-side electric connector, FIG. 3 a perspective view of the optical backplane connector taken from the photoelectric conversion module side, FIG. 4 a perspective view of the photoelectric conversion module taken from the backplane side, FIG. 5 a perspective view showing an optical connector 10, and FIG. 6 a perspective view showing a part of the optical backplane.

Figure 7:
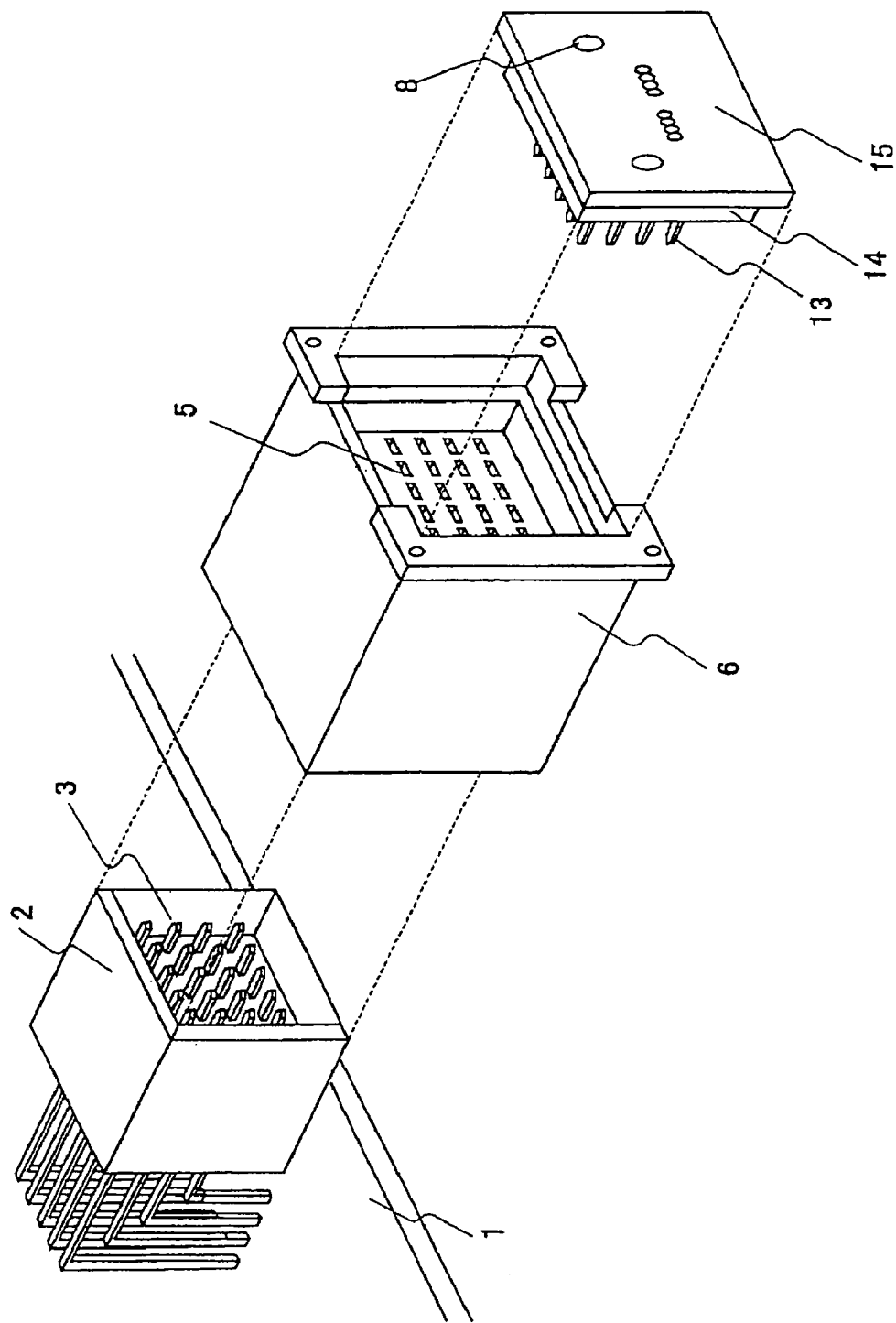
FIG. 7 An assembly diagram of the board-side electric connector, the optical backplane connector and the photoelectric conversion module.
Figure 8:
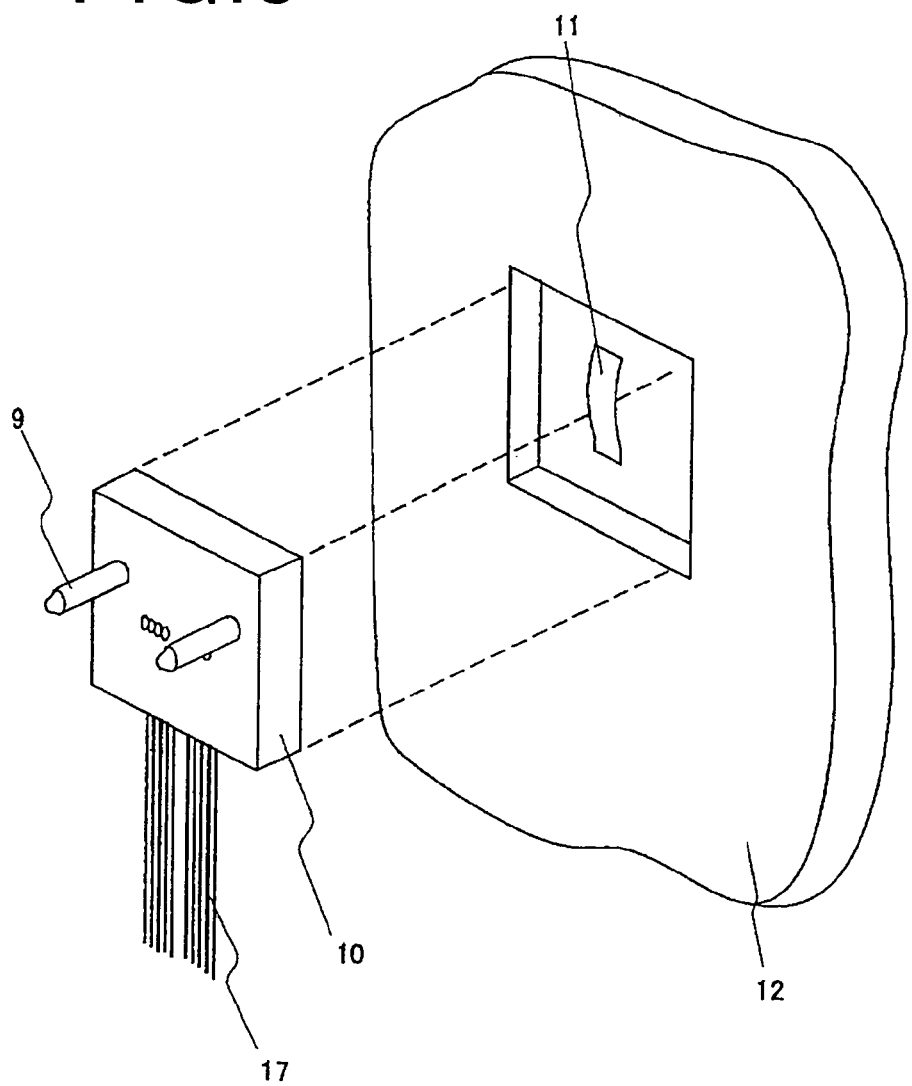
FIG. 8 An assembly diagram of the optical backplane and the optical connector.

FIG. 7 is an assembly diagram of the board-side electric connector, the optical backplane connector and the photoelectric conversion module, and FIG. 8 an assembly diagram of the optical backplane and the optical connector. The optical backplane connector accommodating the photoelectric conversion module and the optical backplane with the optical backplane connector mounted thereon make up an optical transmission device.

With reference to FIGS. 1, 7, 8, the connection of each configuration is explained. The optical backplane connector 6 which the board 1 can be taken out and putted in is mounted on the optical backplane 12 having optical transmission paths 17 in the direction perpendicular to the optical backplane surface. The optical transmission paths 17 are arranged substantially in parallel to the surface of the optical backplane 12. The optical transmission paths 17 according to this embodiment are laid on the optical backplane 17. As the optical transmission paths 17, for example, the optical fibers, the optical fiber array or the optical fiber sheet can be used.

The optical backplane connector 6 includes outer electric contacts 4 (FIG. 1) to be electrically connected with the electric contacts 3 of the connector 2 arranged on the board 1, and includes inner electric contacts 5 to be electrically connected with the photoelectric conversion module 14. The optical backplane connector 6 is formed with a depression conforming with the shape of the photoelectric conversion module 14 in such a manner as to be fitted with the photoelectric conversion module 14. The optical backplane connector 6 can accommodate the photoelectric conversion module in the depression. The inner electric contacts 5 are arranged in the depression (the bottom portion of the depression in this case), so that by inserting the photoelectric conversion module 14 into the depression, the inner electric contacts 5 of the optical backplane connector 6 and the electric contacts 13 of the photoelectric conversion module are electrically connected to each other.

As shown in FIG. 3, two incisions (notches) is formed at the backplane mounting portion 6A of the optical backplane connector 6. The transparent board 15 of the photoelectric conversion module 14 fitted in the optical backplane connector 6 is exposed to two incisions. By grasping this transparent board 15, therefore, the photoelectric conversion module 14 can be taken out from the optical backplane connector 6. Thus, the photoelectric conversion module 14 can be easily taken out. The direction of the light incident to or exiting from the photoelectric conversion module 14 is set substantially perpendicular to the optical backplane 12. By setting the incident and exiting light in the direction substantially perpendicular to the optical backplane, the effect that the variation of the amount by which the photoelectric conversion module 14 pressed to fit into the optical transmission paths has on the displacement of the optical axis can be reduced.

The photoelectric conversion module 14 and the board-side connector 2 are connected for high-speed electric wiring by the electric contacts 3, 4, 5 and 13.

The photoelectric conversion module 14 is formed with guide holes 8 to fit on the guide pins 9 formed on the optical transmission paths. The contact and conduction between the electric contacts 13 of the photoelectric conversion module 14 and the inner electric contacts 5 of the optical backplane connector 6 are held by the elasticity of the inner electric contacts 5. With this structure, even in the case where the photoelectric conversion module gets out of order, the photoelectric conversion module can be easily replaced by removing the optical backplane connector, and therefore, the maintainability is improved.

The photoelectric conversion module 14 can be replaced by pulling out the board 1 from the optical backplane connector 6 and removing the optical backplane connector 6 from the optical backplane 12. Next, the photoelectric conversion module 14 accommodated therein is retrieved, and a new photoelectric conversion module is accommodated in place. In this case, the optical backplane connector is screwed to the optical backplane, and by removing this screw, the optical backplane connector 6 is removed from the optical backplane 12.

At end portions of the optical transmission paths 17 on the optical backplane 12, an optical connector 10 having 45' mirrors 16 and the guide pins 9 is mounted. The positioning operation is performed by fitting the guide pins 9 of the optical connector 10 into the fitting holes 8 on the photoelectric conversion module 6. The photoelectric conversion element 7 (FIG. 1) in the photoelectric conversion module 14 and the optical transmission paths 17 are optically coupled to each other through the 45' mirrors in the optical connector 10. By coupling them through the 45' mirrors constituting the light direction changing means for changing the direction of light, the board packaging at narrow pitches is made possible without regard to the limit of the bending radius which otherwise poses the problem in changing the direction of light by bending the optical fiber. In place of the 45' mirrors, the end portions of the optical transmission paths may be cut aslant and reflection films may be formed on the aslant surfaces to change the direction of light. Also, the direction of light can be changed by curving the end portions of the optical transmission paths.

The photoelectric conversion element 7 receives the light from the optical transmission path 17 by a light-emitting element and/or a photodiode, and converts it into an electrical signal, and/or converts the electrical signal from the board 1 into an optical signal. The photoelectric conversion element 7 is arranged on a semiconductor substrate arranged on the transparent board 15, the upper surface of the transparent board 15 is formed with a convex module body in such a manner as to cover the photoelectric conversion element 7. The electric contacts 13 are arranged on the module body.

A spring 11 is inserted between the optical connector 10 and the optical backplane 12, so that the physical contact between the photoelectric conversion module 14 and the optical connector 10 is held by the elasticity of the spring 11. As a result, the coupling efficiency is prevented from unstabilized by an extra gap which otherwise might be formed between the photoelectric conversion module and the optical transmission paths.

As long as an elastic member is inserted between the optical connector 10 and the optical backplane 12, any elastic member such as a spring, a rubber sheet, a flat spring, urethane or the like may be used in place of the spring.

Second Embodiment

Figure 9:
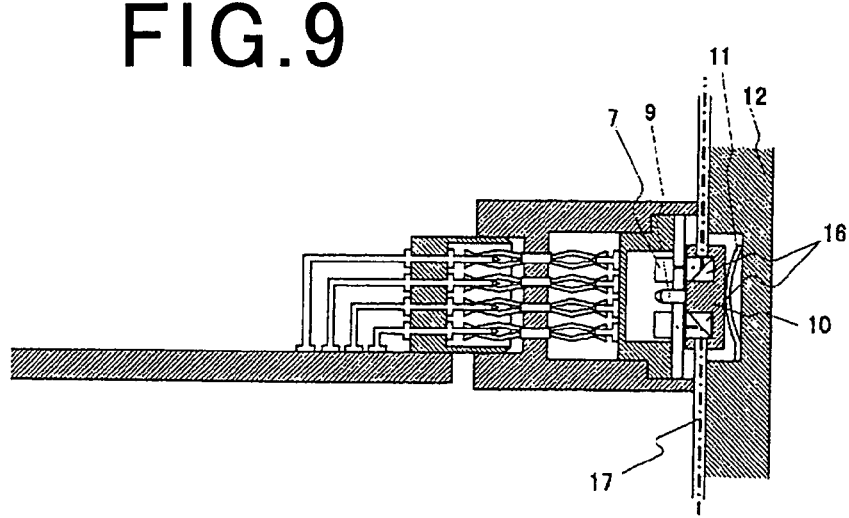
FIG. 9 A sectional view showing an optical backplane connector and an optical backplane according to a second embodiment of the invention.

FIG. 9 shows the optical backplane connector and the optical backplane according to a second embodiment of the invention. In FIG. 9, the same component members as those of FIG. 1 are designated by the same reference numerals, respectively, and not explained further. The photoelectric conversion module 14 accommodates therein a plurality of photoelectric conversion elements 7 which are coupled to the optical transmission paths 17 extending in different directions. The fitting holes 8 of the photoelectric conversion module 6 are formed between the photoelectric conversion elements 7, and the guide pins 9 of the optical connector 10 are inserted in the fitting holes 8. According to this embodiment, the switch board mounted in the neighborhood of the center of the rack can be connected with the signal input/output board mounted on each of the right and left sides in such a manner that the surrounding connecting wires of the optical transmission paths on the optical backplane can be simplified for efficient optical interconnection. In FIG. 9, to facilitate the understanding, a case in which two optical transmission paths 17 are involved is taken as an example. Nevertheless, three or more optical transmission paths 17 may be used with equal effect.

Third Embodiment

Figure 11:
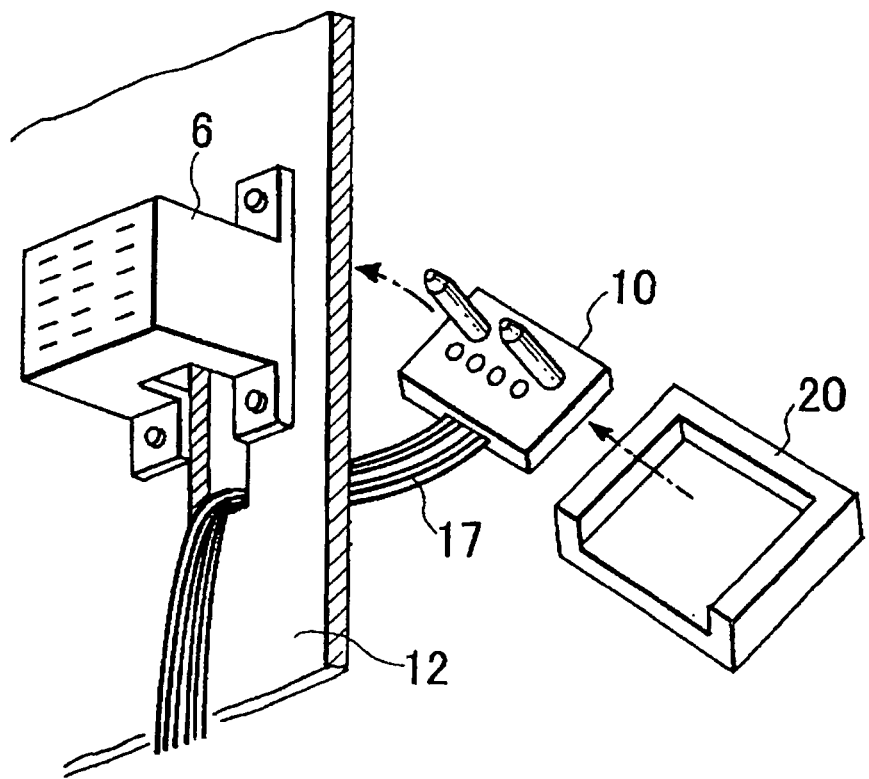
FIG. 11 A diagram showing a method of fixing the optical connector and the lid.

FIG. 10 shows an optical backplane connector and an optical backplane according to a third embodiment of the invention. FIG. 10(a) is an exploded sectional view showing this configuration as viewed from the upper surface of the board, and FIG. 10(b) a sectional view taken from the upper surface of the board inserted into the backplane. Also, FIG. 11 is a diagram showing the method of fixing the optical connector and the lid. In FIGS. 10(a), (b), the same component members as those in FIG. 1 are designated by the same reference numerals, respectively, and not explained further.

According to this embodiment, a lid 20 is arranged on the through-hole in which the optical backplane of the backplane is passed. By opening the lid 20 and pulling out the guide pins 9 of the optical connector 10 from the fitting holes 8 of the photoelectric conversion module 14, the photoelectric conversion module can be taken out to rearward of the optical backplane. With this structure, the photoelectric conversion module can be removed and replaced easily while continuing to drive the device without removing the board 1 in the case where the photoelectric conversion module gets out of order, resulting in a further improved maintainability. The lid 20 may alternatively be replaced with a door mounted on the optical backplane.

Fourth Embodiment

In each of the embodiments described above, the optical backplane connector is explained as a single part not divided. As an alternative, the optical backplane connector may be divisible into two or more component parts. Also with such a configuration, the photoelectric conversion module can be accommodated inside.

Figure 15:
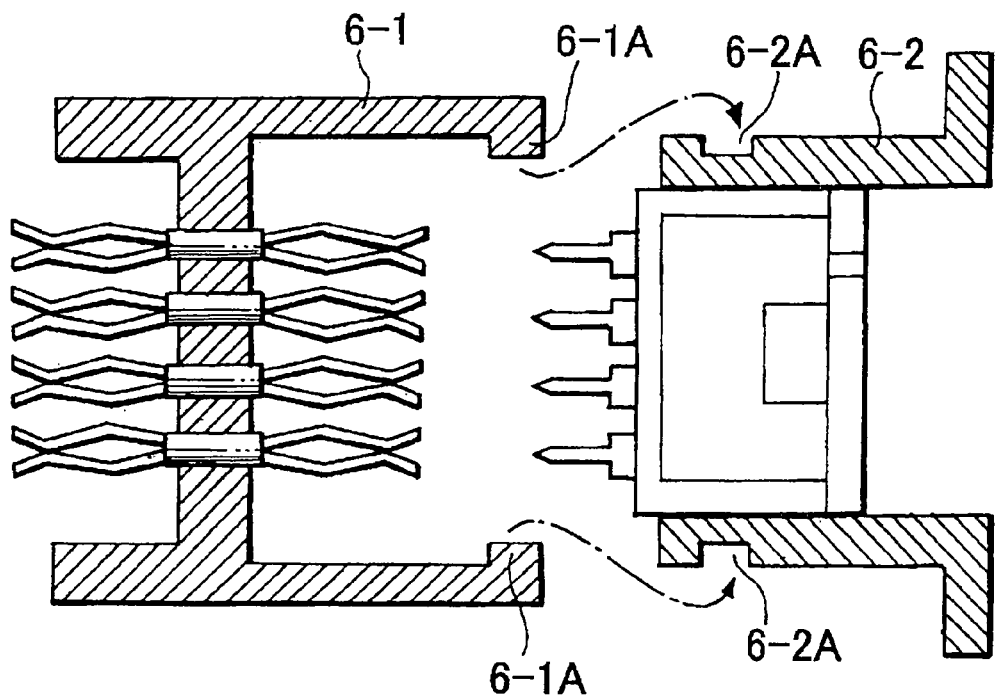
FIG. 15 A sectional view showing an optical backplane connector according to other embodiment of the invention.
Figure 16:
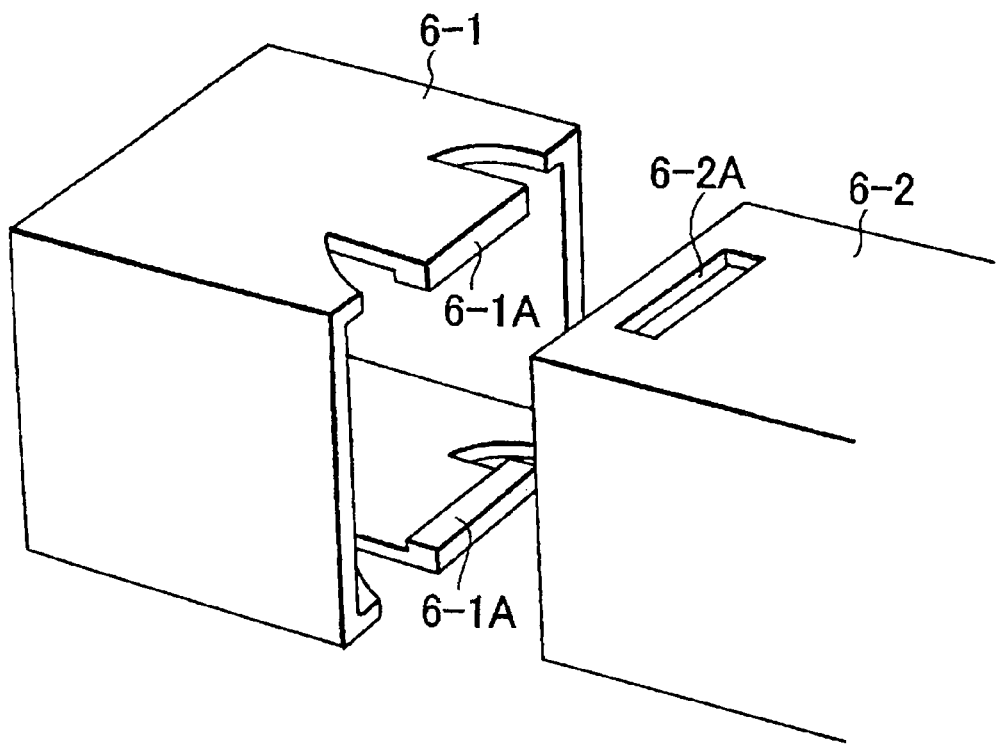
FIG. 16 A perspective view showing the optical backplane connector according to other embodiment of the invention.
Figure 17:
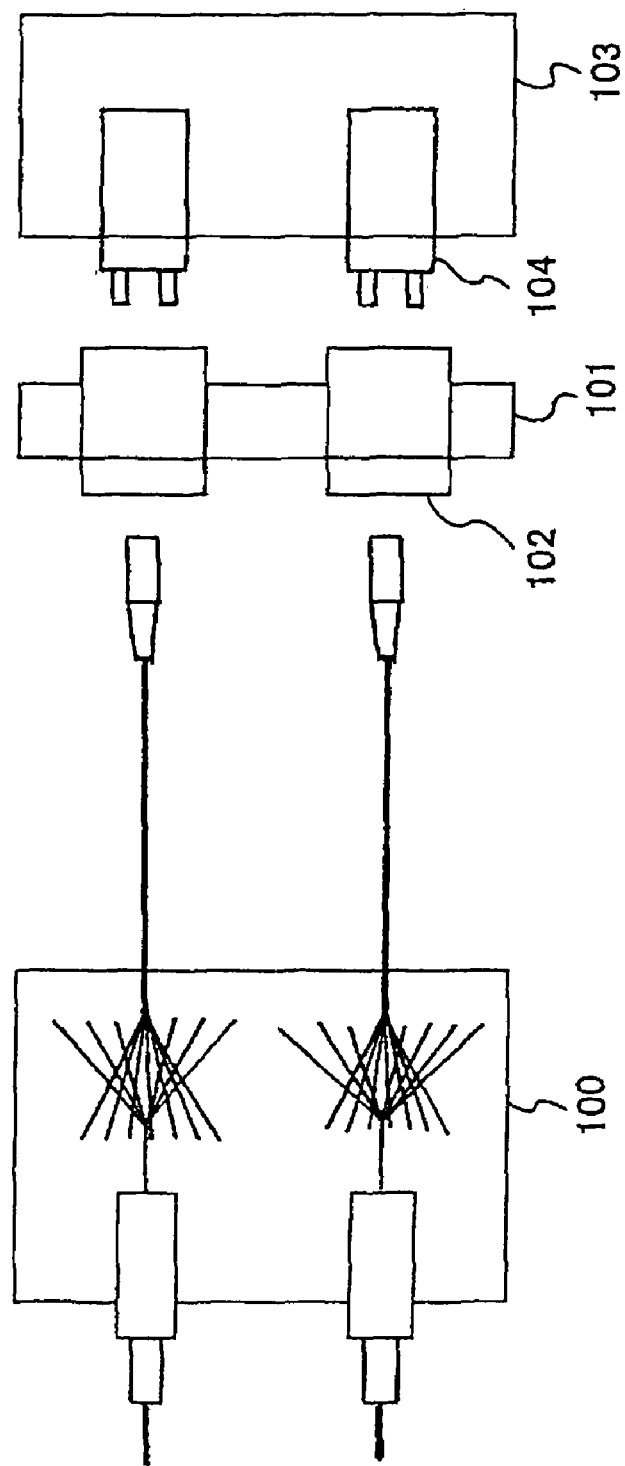
FIG. 17 A diagram showing the connection structure between the board and the optical backplane according to an example of the prior art.
Figure 18:
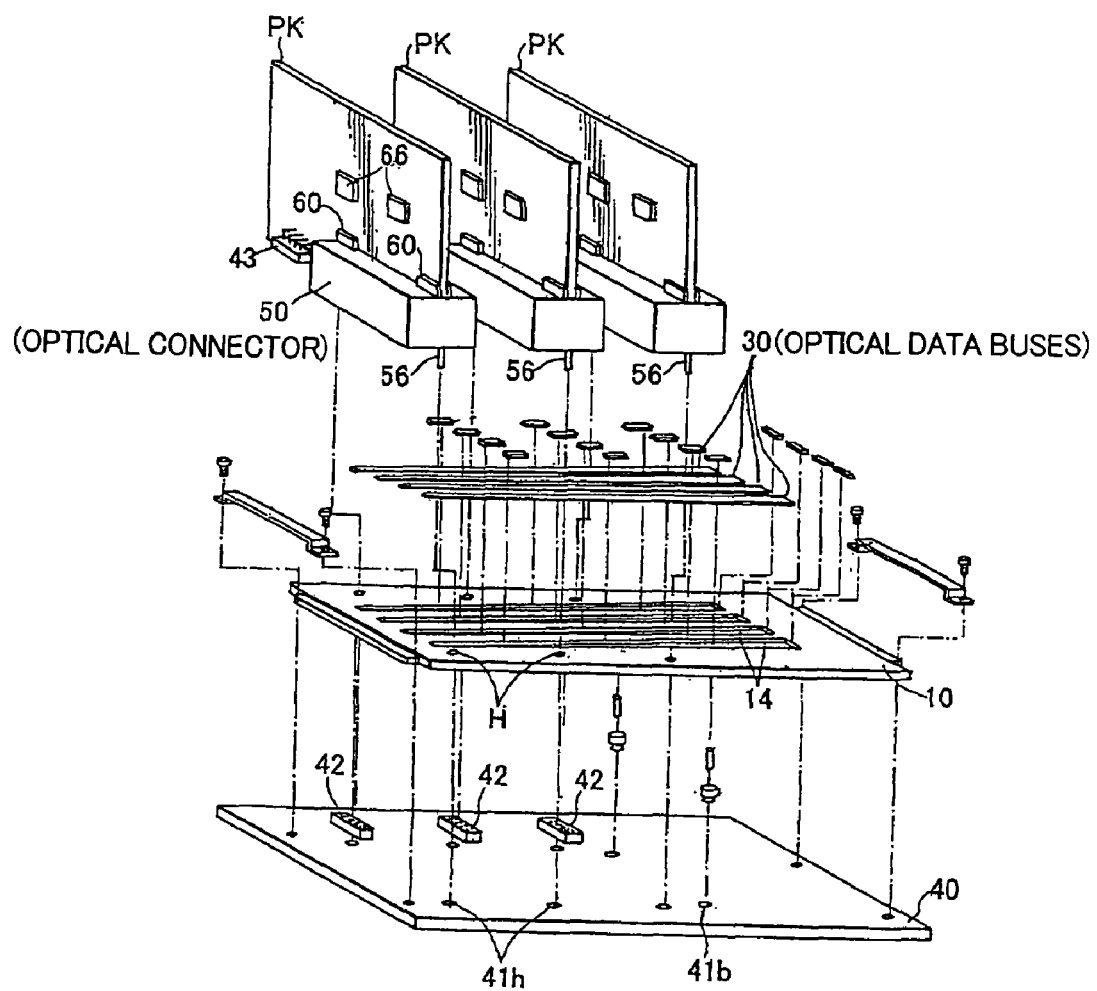
FIG. 18 A diagram showing the connection structure between the board and the optical backplane according to other example of the prior art.
Figure 19:
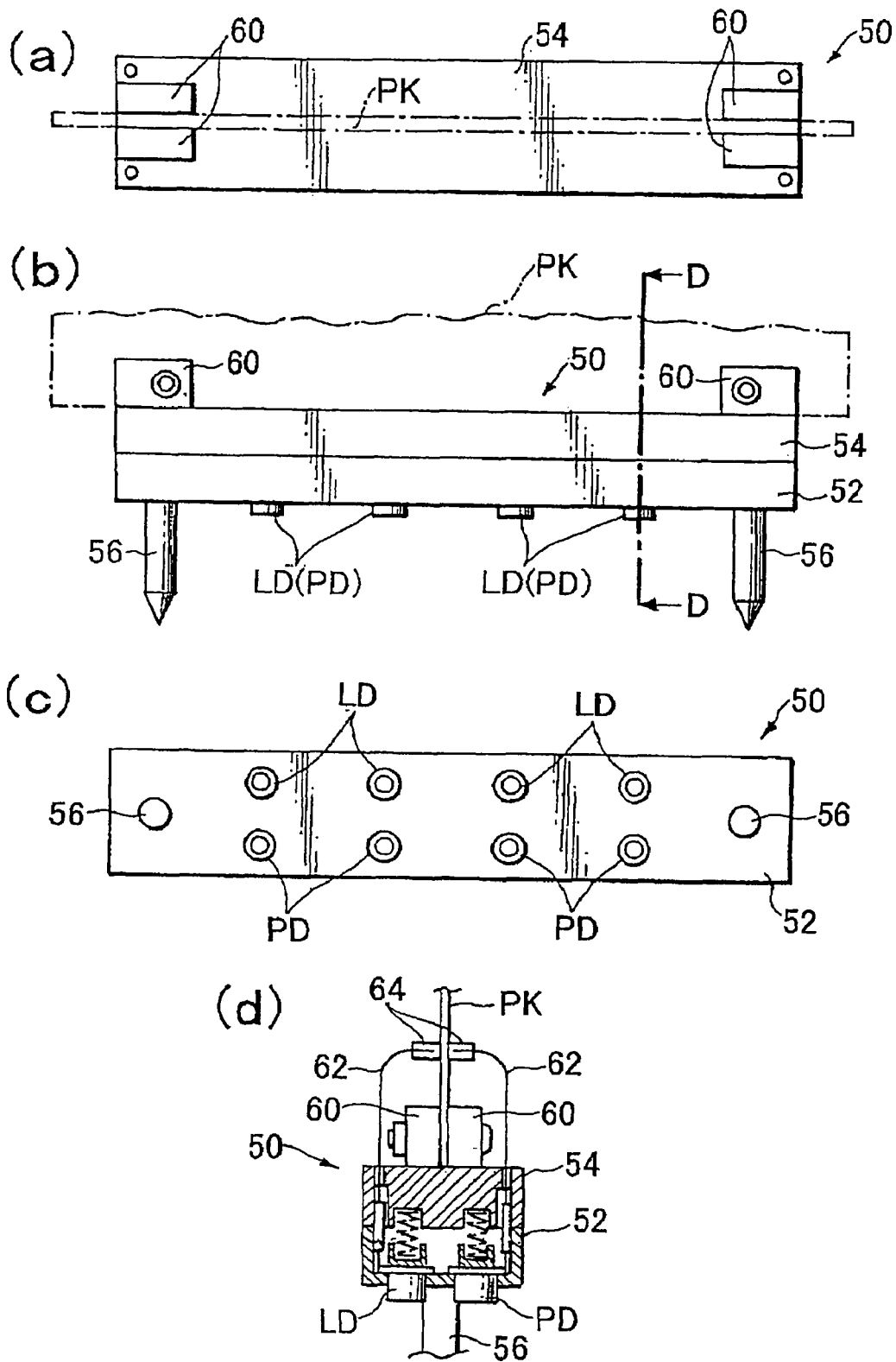
FIG. 19 A diagram showing the connection structure between the board and the optical backplane according to other example of the prior art.

FIG. 15 is a sectional view showing an optical backplane connector according to this embodiment, and FIG. 16 a perspective view thereof. As shown in FIGS. 15 and 16, the optical backplane connector 6 is divisible into two component parts 6-1 and 6-2. After fitting the photoelectric conversion module into the component part 6-2, the component part 6-2 is fitted in the component part 6-1 thereby to connect the electric contacts of the component part 6-1 and the electric contacts of the photoelectric conversion module. As an alternative, after inserting the photoelectric conversion module into the component part 6-1, the component part 6-2 is fitted into the component part 6-1. In those cases, hooks (two hooks in those cases) 6-1A having respective protrusions are formed at the end portion of the component part 6-1, and depressions 6-2A for receiving the hooks are formed in the component part 6-2, so that the two component parts can be fixedly connected to each other. As an alternative, the provision of the hooks on the component part 6-2 and the provision of the depressions on the component part 6-1 for receiving the hooks can make it possible to fixedly connect the two component parts. Also, without fitting the component part 6-2 in the component part 6-1, the component part 6-1 may be fitted in the component part 6-2.

As described above, in the case where the optical backplane connector is divided into the two component parts 6-1 and 6-2, the component part 6-1 can be removed and the photoelectric conversion module can be replaced while the component part 6-2 remains fixed on the optical backplane.

According to each of the embodiments described above, a case in which the whole photoelectric conversion module is accommodated in the optical backplane connector is explained. As an alternative, a part of the photoelectric conversion module (for example, the portion of the transparent board 15) may be incorporated in the optical backplane without being accommodated in the optical backplane connector.

Figure 12:
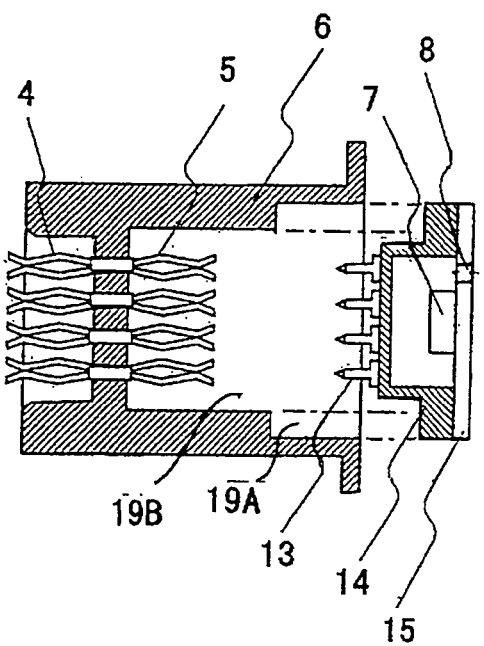
FIG. 12 A sectional view showing an optical backplane connector and an optical backplane according to other embodiment of the invention.

Also, according to the embodiments described above, the protrusion inserted in the depression of the optical backplane connector 6 of the photoelectric conversion module may alternatively be so shaped that a part of the protrusion is fitted in a part of the depression. As shown in FIG. 12, for example, the portion including the transparent board 15 of the photoelectric conversion module is formed to fit with the first depression 19A of the optical backplane connector 6 and fitted in the first depression 19A, while the portion having the electrical contacts 13 is formed smaller than the second depression 19B (the depression at the back of and smaller than the first depression) of the optical backplane connector 6 but not formed to fit in the second depression 19B.

Figure 13:
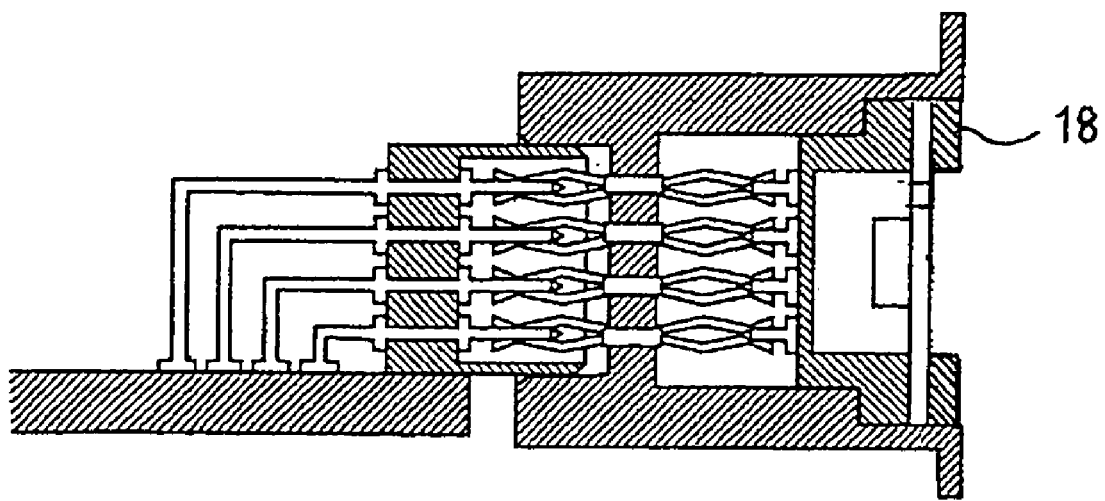
FIG. 13 A sectional view showing an optical backplane connector and an optical backplane according to other embodiment of the invention.

Also, in each embodiment, the optical connector 10 may be not required to be arranged in contact with the photoelectric conversion module 14. Instead, as shown in FIG. 13, the photoelectric conversion module 14, after being inserted into the optical backplane connector 6, may be covered by a lid 18 having an opening or a door mounted on the optical backplane connector 6, and the optical connector 10 may be mounted on the lid 18 or the door. Also, two or more photoelectric conversion modules may be arranged in the optical backplane connector 6.

Further, according to the technical concept of the invention, the photoelectric conversion module is accommodated in the optical backplane connector. However, the photoelectric conversion module may be not necessarily fitted in the depression of the optical backplane connector 6. As long as a sufficient connection reliability can be secured by the connection between the electric contacts 5 and the electric contacts 13, for example, the photoelectric conversion module is not required to have a protrusion to be fitted in the depression of the optical backplane connector 6, and the photoelectric conversion module is not required to be in contact with the inner wall of the depression of the optical backplane connector 6.

Fifth Embodiment

A photoelectric conversion method according to an embodiment of the invention is explained.

Figure 14:
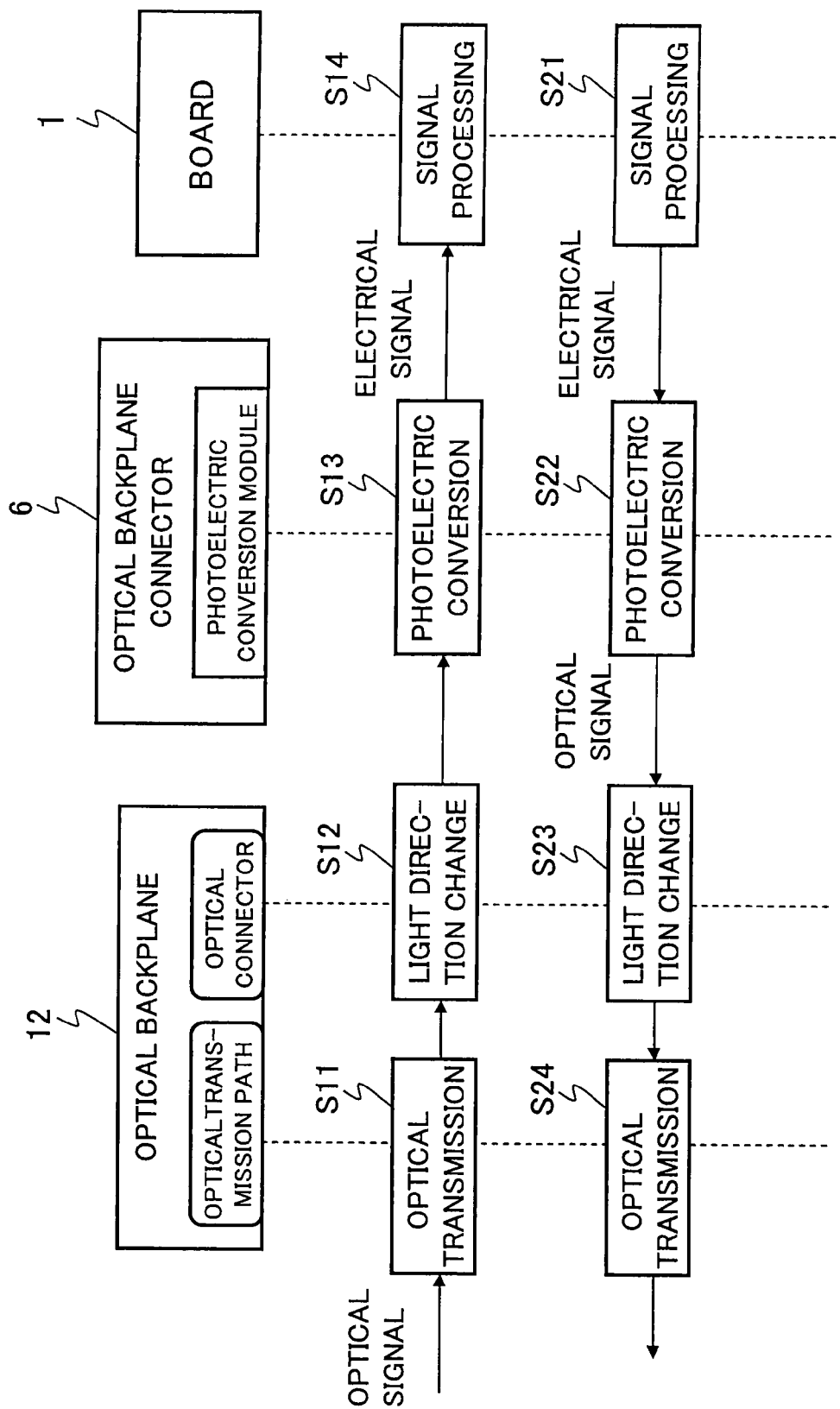
FIG. 14 A diagram showing the flow in which the optical signals from the optical transmission paths are subjected to photoelectric conversion and input the electric signals to the board, and the flow in which the electric signals output from the board are subjected to photoelectric conversion and sent to the optical transmission paths.

FIG. 14 is a diagram showing the flow (steps S11 to S14) in which the optical signals from the optical transmission paths are subjected to photoelectric conversion and electrical signals are input to the board, and conversely the flow (steps S21 to S24) in which the electric signals output from the board are subjected to photoelectric conversion and sent to the optical transmission path.

First, an explanation is given about the flow in which the optical signals from the optical transmission paths 17 are subjected to photoelectric conversion and electrical signal are input to the board 1.

The optical signals are transmitted through the optical transmission paths 17 arranged substantially in parallel to the optical backplane 12 (step S11), and by reaching the optical connector 10, changed in direction substantially perpendicularly by the 45' mirrors 16 of the optical connector 10 (step S12). The optical signals of which the light has been changed in direction enter the photoelectric conversion module 14 accommodated removably in the backplane connector 6, and after being subjected to photoelectric conversion into electrical signals (step S13), the electrical signals are input to the board 1 where the electrical signals are processed as required (step S14).

Next, the flow in which the electric signals output from the board 1 are subjected to photoelectric conversion and sent by the optical transmission paths 17 is explained.

The electric signals subjected to the required signal processing such as signal generation and amplification in the board 1 (step S21) are input to the photoelectric conversion module 14 accommodated removably in the backplane connector 6, and subjected to photoelectric conversion into optical signals (step S22). The optical signals thus subjected to photoelectric conversion are changed in light direction substantially perpendicularly by the 45' mirrors 16 of the optical connector 10 (step S23), and The optical signals are output to the optical transmission paths 17 arranged substantially in parallel to the optical backplane 12, and optically transmitted (step S24).

The present invention can be embodied in various other forms without departing from the spirit and the main features thereof. Each of the embodiments described above, therefore, is only illustrative but should not be interpreted as limitative. The scope of this invention is defined by the claims but not restricted any way by the text of the specification. Further, all modifications and alterations made to the degree equivalent to the scope of the claims are included in the scope of the invention.

The invention claimed is:

1. An optical backplane connector mountable on an optical backplane, wherein the optical backplane connector mountable has a depression adapted to accommodate at least one of photoelectric conversion module, and electric contacts adapted to be connected to the electric contacts of the photoelectric conversion module are disposed in the depression.

2. The optical backplane connector according to claim 1, wherein the depression is opened in such a manner that the photoelectric conversion module can be inserted into and removed from the side which the optical backplane connector is mounted on the optical backplane.

3. A photoelectric conversion module adapted to be fitted in the depression of an optical backplane connector mountable on an optical backplane, which comprises a protrusion to be fitted in the depression,
wherein electric contacts are disposed on the face of the protrusion and the electric contacts are connected to electric contacts in the depression of the optical backplane connector.

4. The photoelectric conversion module according to claim 3, comprising a transparent substrate, a substrate including a photoelectric conversion element, the substrate being arranged on one main surface of the transparent substrate, and a module body having a protrusion, the module body being arranged on one main surface of the transparent substrate in such a manner as to cover at least the substrate,
wherein the electric contacts connected to the electric contacts in the depression of the optical backplane connector are arranged on the module body.

5. An optical backplane mountable thereon an optical backplane connector adapt to accommodate at least one photoelectric conversion modules therein,
wherein:
an optical transmission path of at least one channel and an optical connector for changing the direction of light between the optical transmission path and the photoelectric conversion element of the photoelectric conversion module is mountable on the optical backplane; and
the optical backplane includes an elastic member for pressing the optical connector in such a manner that the photoelectric conversion element in the photoelectric conversion module is optically coupled to the optical transmission path, the elastic member pressing the surface of the optical connector at an opposite side to the arrange side of the photoelectric conversion module with respect to the optical connector.

6. The optical backplane according to claim 5, wherein the optical connector includes a light direction changing means arranged at the end portion of the optical transmission path, the light direction changing means changing the direction of light between the optical transmission path and the photoelectric conversion element of the photoelectric conversion module.

7. The optical backplane according to claim 6, wherein the optical transmission paths extending into a plurality of different directions are connected to the optical connector and the optical connector have a plurality of the light direction changing means.

8. The optical backplane according to claim 7, wherein a through-hole is formed at the portion of the optical backplane corresponding to the portion where the optical backplane connector is arranged, the optical backplane including a means for closing the through-hole.

9. The optical backplane according to claim 6, wherein a through-hole is formed at the portion of the optical backplane corresponding to the portion where the optical backplane connector is arranged, the optical backplane including a means for closing the through-hole.

10. The optical backplane according to claim 5, wherein the optical backplane has a depression for inserting the optical connector therein, and the elastic member is arranged between the optical connector and the surface in the depression.

11. The optical backplane according to claim 10, wherein a through-hole is formed at the portion of the optical backplane corresponding to the portion where the optical backplane connector is arranged, the optical backplane including a means for closing the through-hole.

12. The optical backplane according to claim 5, wherein the optical transmission path is arranged substantially in parallel to an optical backplane surface.

13. The optical backplane according to claim 12, wherein a through-hole is formed at the portion of the optical backplane corresponding to the portion where the optical backplane connector is arranged, the optical backplane including a means for closing the through-hole.

14. The optical backplane according to claim 5, wherein a through-hole is formed at the portion of the optical backplane corresponding to the portion where the optical backplane connector is arranged, the optical backplane including a means for closing the through-hole.

15. An optical transmission device comprising an optical backplane connector which a photoelectric conversion module is accommodated therein, the optical backplane connector having a depression adapted to accommodate the photoelectric conversion module; and
an optical backplane including an optical transmission path which is optically coupled to the photoelectric conversion element of the photoelectric conversion module, the optical backplane connector being mounted on the optical backplane,
wherein the photoelectric conversion module comprises a protrusion to be fitted in the depression, and first electric contacts adapted to be connected to second electronic contacts of the photoelectric conversion module are disposed in the depression, the second electric contacts being disposed on the face of the protrusion.

16. The optical transmission device according to claim 15, wherein:
the optical connector is arranged at the end portion of the optical transmission path, the optical connector including light direction changing means for changing the direction of light between the optical transmission path and the photoelectric conversion element of the photoelectric conversion module; and
the photoelectric conversion module and the optical connector include first and second positioning means, respectively, fitted with each other.

17. A photoelectric conversion method of optical transmission device including an optical backplane connector and an optical backplane, the optical backplane connector being mounted on the optical backplane, the method comprising:

inputting an optical signal input from an optical transmission path to an photoelectric conversion module through an optical connector for bending the optical path substantially perpendicularly, the optical transmission path being arranged substantially in parallel to the optical backplane and the photoelectric conversion module being accommodated removably in the optical backplane connector; and carrying out the photoelectric conversion by the photoelectric conversion module, wherein the optical backplane connector has a depression adapted to accommodate the photoelectric conversion module, the photoelectric conversion module has a protrusion to be fitted in the depression, and first electric contacts adapted to be connected to second electric contacts of the photoelectric conversion module are disposed in the depression, the second electric contacts being disposed on the face of the protrusion.

18. A photoelectric conversion method of optical transmission device including an optical backplane connector and an optical backplane, the optical backplane connector being mounted on the optical backplane, the method comprising:

inputting an electrical signal to a photoelectric conversion module accommodated removably in an optical backplane connector, changing the direction of light of an optical signal subjected to photoelectric conversion by the photoelectric conversion module, by an optical connector for bending the optical path substantially perpendicularly, and outputting the optical signal to an optical transmission path arranged substantially in parallel to the optical backplane, wherein the optical backplane connector has a depression adapted to accommodate the photoelectric conversion module, the photoelectric conversion module has a protrusion to be fitted in the depression, and first electric contacts adapted to be connected to second electric contacts of the photoelectric conversion module are disposed in the depression, the second electric contacts being disposed on the face of the protrusion.

* * * * *